No. 805,711. PATENTED NOV. 28, 1905.
F. B. CLARK.
APPARATUS FOR LOADING AND UNLOADING SHIPS.
APPLICATION FILED DEC. 20, 1904.
2 SHEETS—SHEET 1.
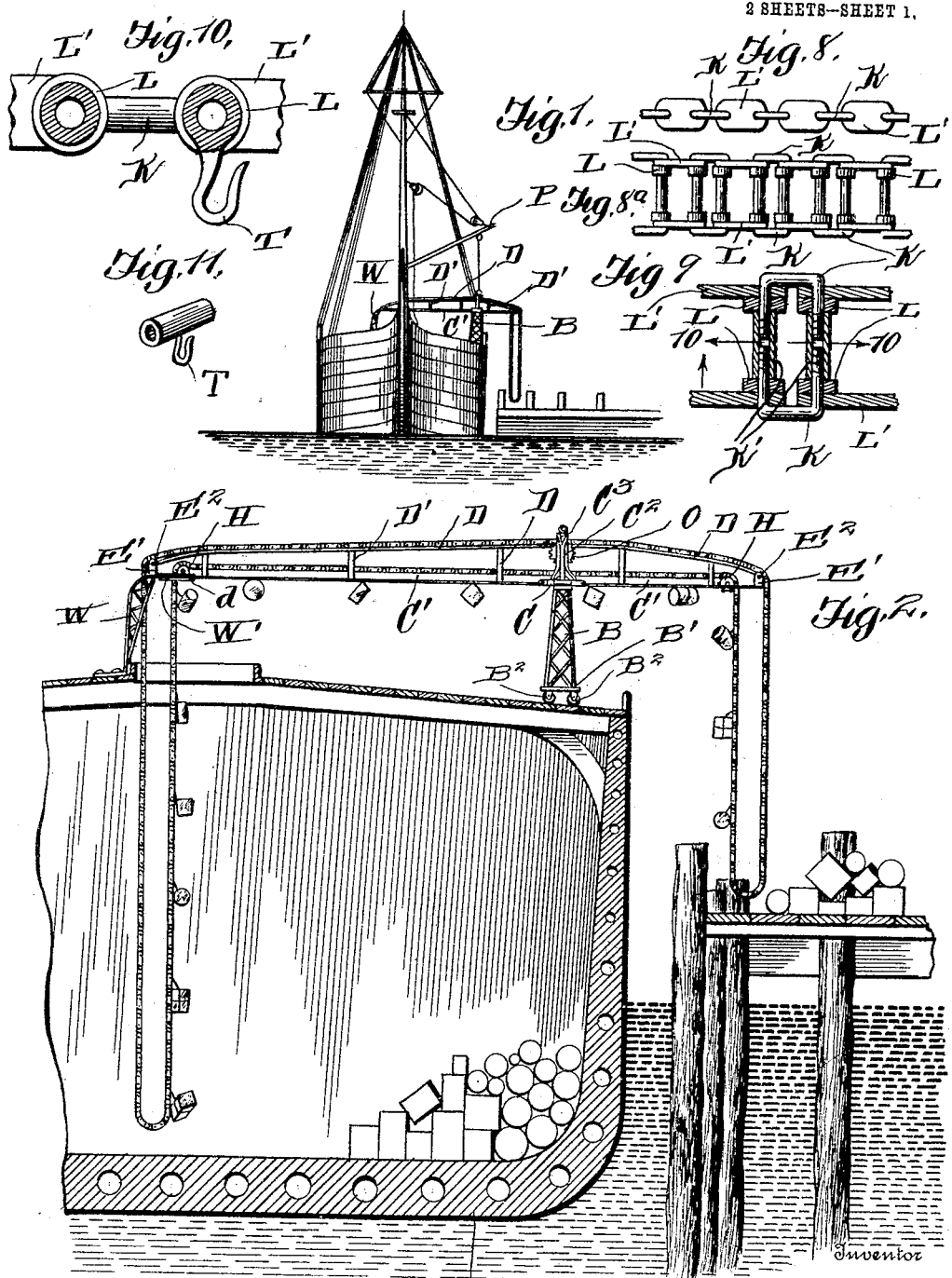

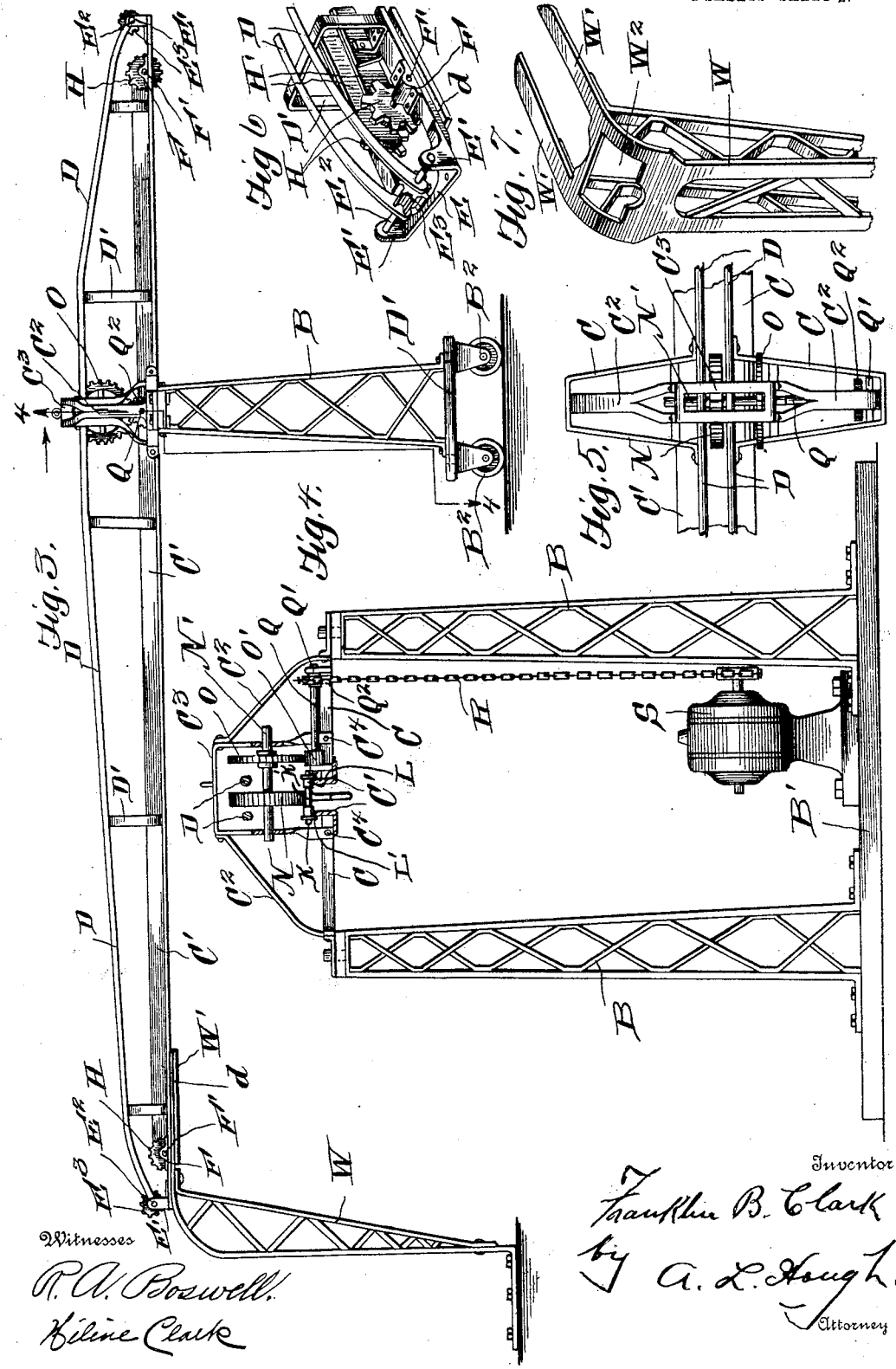

UNITED STATES PATENT OFFICE.

FRANKLIN B. CLARK, OF WASHINGTON, DISTRICT OF COLUMBIA, ASSIGNOR TO THE AMERICAN LOADING AND UNLOADING MACHINE CO., (INC.,) OF VIRGINIA.

APPARATUS FOR LOADING AND UNLOADING SHIPS.

No. 805,711.  Specification of Letters Patent.  Patented Nov. 28, 1905.

Application filed December 20, 1904. Serial No. 237,694.

*To all whom it may concern:*

Be it known that I, FRANKLIN B. CLARK, a citizen of the United States, residing at Washington, in the District of Columbia, have invented certain new and useful Improvements in Apparatus for Loading and Unloading Ships; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for loading and unloading ships or for other purposes, and comprises an endless carrier, which is mounted upon suitable sprocket-wheels and supported by a truss-framework and so arranged that it may be easily moved from place to place and readily adjusted for use.

The object of the invention is to produce a means whereby commodities of various kinds may be loaded and unloaded expeditiously and comprises various details of construction and combinations and arrangements of parts, which will be hereinafter fully described and then specifically defined in the appended claims.

My invention is illustrated in the accompanying drawings, which, with the letters of reference marked thereon, form a part of this application, and in which drawings similar letters of reference indicate like parts in the views, in which—

Figure 1 is a diagrammatic view showing the application of my invention for loading and unloading a ship. Fig. 2 is a cross-sectional view through a ship, showing the apparatus in elevation. Fig. 3 is an enlarged elevation of the apparatus embodying the features of the invention. Fig. 4 is a sectional view on line 4 4 of Fig. 3. Fig. 5 is a top plan view of a portion of the apparatus. Fig. 6 is a detail perspective view showing one end of the truss-frame and the sprocket-wheels carried thereby. Fig. 7 is an enlarged detail view of a bracket-support for one end of the truss-frame. Fig. 8 is an edge view of a section of the endless carrier. Fig. 8ª is a plan view of the endless carrier. Fig. 9 is an enlarged sectional view through links of the endless carrier. Fig. 10 is a sectional view on line 10 10 of Fig. 9, and Fig. 11 is a detail perspective view showing one of the hook-carrying members upon the endless chain.

Reference now being had to the details of the drawings by letter, A designates the hull of a ship which is to be loaded or unloaded by the application of my improved apparatus and to which my apparatus is applied in readiness for use.

B B designate two standards, made, preferably, of structural iron and suitably braced, which rise from the platform B' of a truck which is mounted upon wheels B². (Shown clearly in Fig. 3 of the drawings.) Said standards support the horizontally-disposed bars C, fastened to the angle-bars C', the upper edges of which form the tracks upon which the endless carrier rests, straddling the space between the same, and which tracks support the weight of the commodities being conveyed by the carrier. Said bars C are yoke-shaped, as shown in Fig. 5 of the drawings, and are securely braced by the inclined bars C², which are fastened at their lower ends to said bars C and at their upper ends to the yoke C³, the lower ends of the latter being fastened at C⁴, near the inner ends of the bars C, as shown clearly in Fig. 4 of the drawings, thereby securely bracing the parts and forming a rigid support not only for the angle-bars but also for the tracks D D, upon which the carrier rests as it returns in one direction or the other after the commodities being conveyed have been discharged. Said tracks D D (shown clearly in Figs. 3, 5, and 6 of the drawings and also in section in Fig. 4) are supported by yokes D', resting upon the horizontal portion of said angle-bar, and are so braced as to withstand enormous strain coming upon the same incident to supporting heavy weights. The ends of said tracks D are downwardly-inclined, and the ends of the angle-bars are connected by a cross-piece E, having ears E', projecting upward therefrom, which carry a shaft E², which shaft passes through the ends of the tracks D. A sprocket-wheel E³ is mounted upon the shaft E² and about which the portion of the endless chain or carrier after discharging its commodities travels either in one direction or the other, accordingly as the articles are conveyed in one direction or the other.

Mounted in suitable bearings F upon the horizontal portions of the angle-bars are stub-shafts F', to each of which is fixed a sprocket-wheel H spaced apart, and plates H' are fastened to the inner faces of the vertical portions of the angle-bars and are adjacent to the inner faces of said sprocket-wheels H, and the upper edges of said plates H' serve as tracks upon which the endless carrier is adapted to travel after leaving the ends of the angle-bars, it being understood that the sprocket-wheels H turn in cut-away portions of the angle-bars, thus necessitating the extension of the track H'. Each end of the truss-frame is similarly equipped with sprocket-wheels over which the endless carrier passes. Said endless carrier, sections of which are shown in Figs. 8 and 9 of the drawings, is made up of series of links, each of which is made up of U-shaped members K, the inner ends of which are threaded in opposite directions and are adapted to be drawn toward each other by the threaded ends of said members engaging the cylinders K', which are interiorly threaded in opposite directions, and at the ends of said cylindrical sections are the antifriction-rollers L, which are of larger diameter than said cylinders and are adapted to travel upon the upper edges of the angle-bars and receive the weight of the commodities being conveyed, while on the return movement of the chain said friction-wheels are adapted to travel on the tracks D, thus reducing the friction to a minimum. Links L' connect the members K, as shown, and the distances between the cylinders of the carrier are substantially equal. The endless carrier is driven by means of a sprocket-wheel N, which is mounted upon a shaft N', journaled in the upright portions of the yokes C³, as shown clearly in Fig. 4 of the drawings, it being observed that the teeth of the sprocket-wheel N engage the teeth of the carrier at diametrically opposite positions from the sprocket-wheel, thereby driving the carrier in opposite directions simultaneously.

The shaft N' has fixed thereto a gear-wheel O, which is in mesh with a gear-wheel O', fixed to the shaft Q, which is mounted in suitable bearings Q' upon one of the bars C, and one of said angle-bars supporting said bars. A sprocket-wheel Q² is fixed to the shaft Q and is driven by means of an endless chain R, to which power is communicated from a motor S, which is mounted upon the truck B'. At intervals along the endless-chain carrier are hooks T, (shown clearly in Figs. 10 and 11,) which are integral with or secured to the cylinders which receive the inner ends of the links K and upon which hooks, ropes, or other fastening means which are connected to the commodities being conveyed are engaged.

One end of the truss-frame is supported by means of a standard W, an enlarged detail view of the upper portion of one of said standards being shown in Fig. 7 of the drawings, which standard has arms W', which are adapted to engage slots $d$, which are formed on the opposite edges of the angle-bars, as shown in Fig. 6 of the drawings, whereby said arms may be slid into said slots for the purpose of causing said frame to be held from lateral movement and affording means whereby the standard may be easily removed when it is desired to move the apparatus from one place to another. It will be observed by reference to Fig. 7 of the drawings that the standard W has an aperture W², through which the chain (shown in Fig. 2 of the drawings) moves when returning back over the tracks D.

In Fig. 1 of the drawings a derrick P is shown with tackle connections therewith and means for attachment to the loading and unloading apparatus, whereby the same may be swung from one position to another in the event of it being desired to load or unload a ship from one side or the other or for the purpose of moving the loading and unloading apparatus from place to place.

The operation of the apparatus is simple and will be readily understood, and in applying the same the truck is positioned at any convenient location upon the deck of the vessel and the standard W is positioned adjacent to the hatchway, thereby affording support for the truss-frame and affording means for sustaining heavy commodities being loaded or unloaded. The endless carrier being put in motion, the operators in loading the commodities will first apply loops about the boxes, barrels, bales, or other articles and catch the loops in the hooks of the carrier, and a cargo may be quickly loaded or unloaded, it only being necessary to have a sufficiently large force of hands on the dock and in the hold to hang the commodities upon the hooks of the carrier and remove the same when they have been conveyed to the hold.

While I have shown a particular form of apparatus illustrating the features of my invention, it will be understood that the details of the apparatus may be varied to meet different conditions—as, for instance, when the loading or unloading apparatus is used for various purposes other than in connection with ships—and without in any way departing from the spirit of the invention. In the application of the invention as illustrated the same, while it is shown in connection with the loading and unloading of ships it is my purpose to utilize the same for transporting commodities of any kinds either in bags or parcels of any shape.

Having thus fully described my invention, what I claim as new, and desire to secure by Letters Patent, is—

1. A loading and unloading apparatus, comprising a standard, a truss-frame supported upon said standard, tracks mounted upon said truss-frame, an endless carrier mounted to travel upon said tracks, a support for one end of said truss-frame and through which said endless carrier is adapted to travel, as set forth.

2. A loading and unloading apparatus comprising a standard, a truss-frame made up of an upper and a lower set of tracks connected together and mounted upon said standards, the upper set of said tracks extending beyond the ends of the lower set and downwardly inclined, sprocket-wheels mounted in suitable bearings at the ends of said tracks, an endless-carrier mounted to travel upon said tracks and over said sprocket-wheels, and a support for corresponding ends of said tracks and through which support said carrier is adapted to travel, as set forth.

3. A loading and unloading apparatus comprising a standard, a truss-frame made up of an upper and a lower set of tracks connected together and mounted upon said standards, the upper set of said tracks extending beyond the ends of the lower set and downwardly inclined, sprocket-wheels mounted in suitable bearings at the ends of said tracks, and an endless carrier made up of links, antifriction-wheels mounted upon said links and adapted to travel upon said tracks, a driving-wheel engaging, at points diametrically opposite thereon, the links of said carrier, and means for driving the carrier, as set forth.

4. An apparatus for loading and unloading ships, &c., comprising a truck, standards rising therefrom, a truss-frame supported by said standards, tracks spaced apart and forming a part of said frame, sprocket-wheels mounted upon the frame, an endless-chain carrier made up of links, antifriction-wheels mounted upon said links and adapted to travel upon said track, a driving-wheel engaging at points diametrically opposite thereof, the links of said carrier, a motor and connections between the same and said driving-wheel, and hooks arranged at intervals upon said endless carrier, as set forth.

5. An apparatus for loading and unloading ships, &c., comprising a truck, standards rising therefrom, two sets of tracks, yokes connecting said tracks and forming a truss-frame mounted upon said standards, sprocket-wheels at the ends of tracks, the upper of said tracks projecting beyond the ends of the lower tracks and downwardly inclined, a removable standard designed to support corresponding ends of said tracks, an endless carrier made up of links, rollers upon said links adapted to travel upon said tracks, and means carried by said truck for driving the carrier, as set forth.

6. An apparatus for loading and unloading ships, &c., comprising a truck, standards spaced apart and mounted upon said truck, an upper and a lower set of tracks, said lower set being horizontal and the ends of the upper set projecting beyond the ends of the lower set and inclined, sprocket-wheels mounted upon the outer sides of the lower tracks and adjacent to their ends, sprocket-wheels mounted between the ends of the upper set of tracks, a support for corresponding ends of said tracks, an endless-chain carrier traveling about said sprocket-wheels and traveling upon said tracks, as set forth.

7. An apparatus for loading and unloading ships, &c., comprising a truss-frame, angle-bars spaced apart and forming a part of said frame, a truck, standards mounted thereon and supporting said frame, sprocket-wheels mounted at the ends of said angle-bars and spaced apart, tracks mounted above said angle-bars, an endless-chain carrier, antifriction-rollers mounted upon the links of the carrier and adapted to travel upon said track, a standard having horizontally-disposed projections adapted to engage flanges upon said angle-bars to hold the end of the truss-frame, as set forth.

8. An apparatus for loading and unloading ships, &c., comprising a truss-frame, angle-bars spaced apart and forming a part of said frame, a truck, standards mounted thereon and supporting said frame, sprocket-wheels mounted at the ends of said angle-bars and spaced apart, tracks mounted above said angle-bars, an endless-chain carrier, antifriction-rollers mounted upon the links of the carrier and adapted to travel upon said track, and a support for one end of said frame, a standard having horizontally-disposed projections near the upper end thereof designed to engage flanges upon said angle-bars, said carrier adapted to pass through an aperture in said standard at the end of the frame, as set forth.

In testimony whereof I hereunto affix my signature in presence of two witnesses.

FRANKLIN B. CLARK.

Witnesses:
HÉLÈNE CLARK,
A. L. HOUGH.